United States Patent Office 2,847,422
Patented Aug. 12, 1958

2,847,422

HYDROXYLATED 2,13-DIMETHYL-7,9-DIOXO-POLYHYDROPHENANTHRENE - 1 - PROPIONIC ACID LACTONES AND SALTS

Raymond M. Dodson, Park Ridge, and Charles G. Castle, Evanston, Ill., assignors, by mesne assignments, to G. D. Searle & Co., Skokie, Ill., a corporation of Delaware No Drawing. Application August 28, 1953
Serial No. 377,260

3 Claims. (Cl. 260—343.2)

This invention relates to lactones of oxygenated 2,13-dimethylpolyhydrophenanthrene-1-propionic acids, to salts of these lactones derived by saponification thereof, and to processes for the preparation of the said lactones and salts from dehydroandrosterones. More particularly, this invention relates to 2,14-dihydroxy-2,13-dimethyl-7,9-dioxoperhydrophenanthrene-1-propionic acid δ-lactone, having the formula

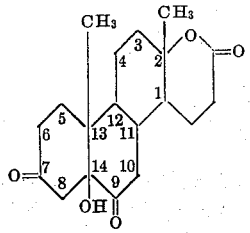

1,2,3,4,5,6,7,9,10,11,12,13-dodecahydro - 2 - hydroxy-2,13-dimethyl-7,9-dioxophenanthrene - 1 - propionic acid δ-lactone, having the formula

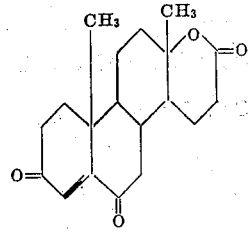

and salts of the corresponding hydroxy acids derived by hydrolytic cleavage of the anhydro ring in the manner shown

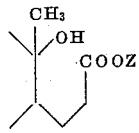

upon treatment of the appropriate parent lactone with alkali, Z in the foregoing part-formula being an alkali metal.

The natural androgens such as androsterone and testosterone have been widely used to supplement or replace the androgenous glandular hormone secretions necessary to normal body function. Experience has shown that the therapeutic benefits of these hormones are ofttimes markedly enhanced by modifications of their chemical structure in such ways as to augment particular activities or otherwise better adapt them to specific glandular dysfunctions. Compounds of the type produced by our invention provide such new molecular arrangements, being of value in the replacement therapy of various androgenic deficiencies. They may be used to supplement the hormone production of the body and are believed capable of entering the body metabolism in a beneficial manner. The compounds to which this invention relates are soluble in alcohol, as also in propylene glycol. They may be administered in solid form as tablets or capsules; dissolved or suspended in aqueous alcohols, they may be given parenterally.

The subject compounds may be conveniently prepared in accordance with the following procedure: A dehydroandrosterone—for example, dehydroepiandrosterone—is first treated for protection of the hydroxy group therein (as by esterification or the equivalent), then reacted directly with an oxidizing agent—such as hydrogen peroxide, peracetic acid, perbenzoic acid, or the like—at moderate temperatures for periods of time ranging from 24 hours to as long as a week. The lactone ester thus obtained is saponified by conventional means—for example, with a 10% methanol-and-water solution of caustic soda at steam bath temperatures for half an hour—to give, upon acidification, the corresponding tetrahydroxy perhydrophenanthrenepropionic acid-δ-lactone. This lactone is, in turn, oxidized—using chromic acid in glacial acetic acid for upward of 6 hours at room temperatures, or the equivalent thereof—to the 7,9-dioxo lactone, one of the comounds of this invention. The saturated 7,9-dioxo lactone is converted to the corresponding $\Delta^{8,14}$ derivative, another of the compounds of this invention, by dehydration, according to usual techniques, with anhydrous hydrogen chloride at ice bath temperatures, using chloroform or like inert, organic solvent as the reaction medium. Salts of the hydroxy acids corresponding to the foregoing lactones are prepared as previously noted by saponification of the said lactones with a base such as caustic soda.

The following examples will illustrate in detail certain of the compounds which constitute the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

*2,13-dimethyl - 2,7β,9β,14α - tetrahydroxyperhydrophenanthrene-1-propionic acid δ-lactone.*—A mixture of 40 parts of dehydroepiandrosterone and 480 parts of 98–100% formic acid is heated to 60° C., at which point a green coloration develops. After ten minutes at 60° C., solution of the reagents is complete, whereupon they are cooled to room temperature and 40 parts of 30% aqueous hydrogen peroxide is then added. The green color rapidly disappears, and a moderate exothermic effect is noted. The reactants are allowed to stand for 3 days, at which point solvents are stripped from the mixture in vacuo, leaving a yellow-green oil which is taken up in 120 parts of methyl alcohol and treated with 35 parts of 40% aqueous caustic soda at steam bath temperatures for 30 minutes. The slurry produced in process is filtered and the filter cake then washed with methyl alcohol. Filtrate and washings are combined and made slightly acid with dilute sulfuric acid, then neutralized with solid sodium bicarbonate. The thick paste obtained at this point is filtered and the salt cake then washed several times on the filter with boiling methyl alcohol. The filtrate and washings thus obtained are combined and the solvent is stripped therefrom in vacuo. Precipitation occurs throughout the stripping operation, the material thrown down being removed in three increments by filtration. The three crops of precipitated material, plus that obtained by crystallization from methyl alcohol of the black tarry residue remaining after all the solvent has been stripped, are combined and comprise the desired 2,13-dimethyl - 2,7β,9β,14α - tetrahydroxyperhydrophenanthrene-1-propionic acid δ-lactone. The product, which may be further purified by recrystallization from methyl alcohol, shows M. P. 312-313° C., [α]_D −60° (0.5% in methyl alcohol).

*2,14 - dihydroxy - 2,13 - dimethyl - 7,9 - dioxoperhydrophenanthrene-1-propionic acid δ-lactone.*—To a solution of 22 parts of 2,13-dimethyl-2,7β,9β,14α-tetrahydroxyperhydrophenanthrene-1-propionic acid δ-lactone in 1000 parts of glacial acetic acid is added a solution of 17 parts of chromic acid in a mixture of 400 parts of glacial acetic acid and 10 parts of water. The reactants are allowed to stand for 3 days at room temperature, whereupon 325 parts of methyl alcohol is added to the resultant green solution; and, after one hour, the materials are concentrated in vacuo to approximately one-fifth of their original volume. The concentrate is neutralized with sodium bicarbonate, and the granular precipitate thus produced is filtered out and then washed with water. Purification of this precipitate by chromatographic adsorption on silica gel, using benzene and ethyl acetate as developing solvents, affords pure 2,14-dihydroxy-2,13-dimethyl-7,9-dioxoperhydrophenanthrene-1-propionic acid δ-lactone, M. P. 254–256° C., [α]_D −50° (1% in methyl alcohol).

*1,2,3,4,5,6,7,9,10,11,12,13 - dodecahydro - 2 - hydroxy - 2,13 - dimethyl - 7,9 - dioxophenanthrene - 1-propionic acid δ-lactone.*—A solution of 26 parts of 2,14-dihydroxy - 2,13 - dimethyl - 7,9 - dioxoperhydrophenanthrene-1-propionic acid δ-lactone in 3900 parts of anhydrous chloroform is cooled to between 0 and 5° C., at which temperatures anhydrous hydrogen chloride is passed therethrough for 3 hours. A yellow color slowly develops. The reaction mixture is washed with a slight excess of saturated aqueous sodium bicarbonate solution and then with water until the water washings are neutral. The solvent is stripped in vacuo; and the residual yellow oil is chromatographed on silica gel, using benzene and ethyl acetate as developing solvents. The 1,2,3,4,5,6,7,9,10,11,12,13 - dodecahydro - 2 - hydroxy - 2,13 - dimethyl-7,9-dioxophenanthrene-1-propionic acid δ-lactone thus obtained is further purified by recrystallization from benzene, showing M. P. 205–207° C., [α]_D −69° (1% in chloroform).

We claim:
1. A member of the group consisting of a compound of the formula

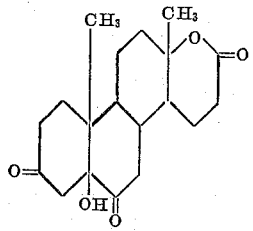

a compound of the formula

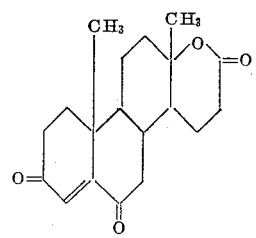

compounds of the formula

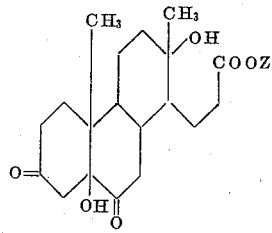

and compounds of the formula

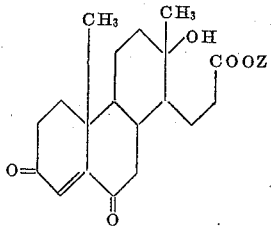

Z in the latter two formulas being an alkali metal.

2. 2,14 - dihydroxy - 2,13 - dimethyl - 7,9 - dioxoperhydrophenanthrene - 1 - propionic acid δ - lactone.

3. 1,2,3,4,5,6,7,9,10,11,12,13 - dodecahydro - 2 - hydroxy - 2,13 - dimethyl - 7,9 - dioxophenanthrene - 1-propionic acid δ-lactone.

References Cited in the file of this patent

Ouchakov et al.: Bull. Soc. Chim. France [5], 4 pp. 1394–8 (1937).

Ehrenstein: J. Org. Chem., vol. 4, pp. 508, 509, 514 (1939).